US006847644B1

(12) United States Patent
Jha

(10) Patent No.: US 6,847,644 B1
(45) Date of Patent: Jan. 25, 2005

(54) HYBRID DATA TRANSPORT SCHEME OVER OPTICAL NETWORKS

(75) Inventor: Pankaj K. Jha, Fremont, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/535,889

(22) Filed: Mar. 27, 2000

Related U.S. Application Data

(60) Provisional application No. 60/184,264, filed on Feb. 23, 2000.

(51) Int. Cl.$^7$ .............................................. H04L 12/28
(52) U.S. Cl. ...................................... 370/392; 370/474
(58) Field of Search ................................ 370/404, 429, 370/442, 452, 470, 471, 473, 474, 475, 468, 415, 466, 907, 537, 538, 539, 392, 389, 401; 714/776, 781, 819

(56) References Cited

U.S. PATENT DOCUMENTS

| 4,236,245 | A | 11/1980 | Freeny et al. ................. 370/94 |
| 4,542,502 | A | 9/1985 | Levinson et al. ............. 370/88 |
| 4,700,341 | A | 10/1987 | Huang ......................... 370/80 |
| 4,761,781 | A | 8/1988 | Calvignac et al. ........... 370/94 |
| 4,939,726 | A | 7/1990 | Flammer et al. ........... 370/94.1 |
| 4,974,189 | A | 11/1990 | Russon et al. .............. 364/900 |
| 4,998,242 | A | 3/1991 | Upp ............................. 370/60 |
| 5,113,392 | A | 5/1992 | Takiyasu et al. .......... 370/85.15 |
| 5,144,619 | A | 9/1992 | Munter ...................... 370/60.1 |

(List continued on next page.)

OTHER PUBLICATIONS

Ben Slimane, F.; Pujolle, G.; Signaling in IP cell–switching; Computers and Communications, 1999. Proceedings. IEEE International Symposium on , Jul. 6–8, 1999 pp.: 116–120.*
W. Simpson, "Request for Comments (RFC) 1619," Internet Engineering Task Force, Network Working Group, May 1994, pp. i, ii, 1–3.*
Wideband Packet over SONET (WPOS), Cisco Sytems, Inc., 1999, pp. 1–8.
Pankaj K. Jha, Hybrid Data Transport Scheme Over Optical Networks, U.S. Appl. No. 09/523,576, filed Mar. 10, 2000.
Pankaj K. Jha, Hybrid Data Transport Scheme Over Optical Networks, U.S. Appl. No. 09/535,717, filed Mar. 27, 2000.

(List continued on next page.)

*Primary Examiner*—Chi Pham
*Assistant Examiner*—Keith M. George
(74) *Attorney, Agent, or Firm*—Christopher P. Maiorana, PC

(57) ABSTRACT

An apparatus having an interface connectable to a network. The interface may be configured to transmit information via a frame in the network. The frame may have a packet envelope carrying a plurality of packets. A first packet may have one or more labels configured to control routing of the first packet through the network and a payload to carry the information.

20 Claims, 8 Drawing Sheets

U.S. PATENT DOCUMENTS

| | | | | |
|---|---|---|---|---|
| 5,208,811 A | * | 5/1993 | Kashio et al. | 370/401 |
| 5,251,217 A | | 10/1993 | Travers et al. | 370/112 |
| 5,282,195 A | | 1/1994 | Hood et al. | 370/58.1 |
| 5,365,272 A | | 11/1994 | Siracusa | 348/426 |
| 5,450,397 A | | 9/1995 | Wahlman | 370/60 |
| 5,526,349 A | | 6/1996 | Diaz et al. | 370/58.1 |
| 5,537,428 A | | 7/1996 | Larsson et al. | 371/37.1 |
| 5,555,243 A | | 9/1996 | Kakuma et al. | 370/58.2 |
| 5,583,859 A | | 12/1996 | Feldmeier | 370/471 |
| 5,610,744 A | | 3/1997 | Ho et al. | 359/118 |
| 5,666,351 A | | 9/1997 | Oksanen et al. | 370/474 |
| 5,784,380 A | | 7/1998 | Kuwahara | 370/509 |
| 5,796,720 A | | 8/1998 | Yoshida | 370/245 |
| 5,796,944 A | | 8/1998 | Hill et al. | 395/200.8 |
| 5,802,043 A | | 9/1998 | Skillen et al. | 370/258 |
| 5,831,970 A | | 11/1998 | Arao | 370/227 |
| 5,912,895 A | | 6/1999 | Terry et al. | 370/445 |
| 5,915,105 A | | 6/1999 | Farmwald et al. | 395/309 |
| 5,915,252 A | | 6/1999 | Misheski et al. | 707/103 |
| 5,920,705 A | | 7/1999 | Lyon et al. | 395/200.7 |
| 5,946,315 A | | 8/1999 | Ramfelt et al. | 370/403 |
| 5,953,263 A | | 9/1999 | Farmwald et al. | 365/194 |
| 5,954,804 A | | 9/1999 | Farmwald et al. | 710/36 |
| 5,978,378 A | * | 11/1999 | Van Seters et al. | 370/401 |
| 5,995,443 A | | 11/1999 | Farmwald et al. | 365/233 |
| 6,011,802 A | | 1/2000 | Norman | 370/466 |
| 6,028,861 A | | 2/2000 | Soirinsuo et al. | 370/395 |
| 6,038,230 A | * | 3/2000 | Ofek | 370/389 |
| 6,047,002 A | | 4/2000 | Hartmann et al. | 370/466 |
| 6,075,788 A | * | 6/2000 | Vogel | 370/395.51 |
| 6,097,720 A | | 8/2000 | Araujo et al. | 370/355 |
| 6,122,281 A | * | 9/2000 | Donovan et al. | 370/401 |
| 6,160,819 A | * | 12/2000 | Partridge et al. | 370/474 |
| 6,169,749 B1 | * | 1/2001 | Dove et al. | 370/474 |
| 6,212,185 B1 | | 4/2001 | Steeves et al. | 370/392 |
| 6,236,660 B1 | * | 5/2001 | Heuer | 370/409 |
| 6,301,254 B1 | * | 10/2001 | Chan et al. | 370/397 |
| 6,320,863 B1 | | 11/2001 | Ramfelt | 370/404 |
| 6,331,978 B1 | * | 12/2001 | Ravikanth et al. | 370/392 |
| 6,356,368 B1 | | 3/2002 | Arao | 359/124 |
| 6,356,544 B1 | * | 3/2002 | O'Connor | 370/353 |
| 6,400,720 B1 | | 6/2002 | Ovadia et al. | 370/395.64 |
| 6,442,694 B1 | | 8/2002 | Bergman et al. | 713/201 |
| 6,469,983 B2 | * | 10/2002 | Narayana et al. | 370/231 |
| 6,501,756 B1 | * | 12/2002 | Katsube et al. | 370/392 |
| 6,532,088 B1 | * | 3/2003 | Dantu et al. | 398/59 |
| 6,546,021 B1 | | 4/2003 | Slane | 370/465 |
| 6,580,537 B1 | * | 6/2003 | Chang et al. | 370/471 |
| 6,584,118 B1 | | 6/2003 | Russell et al. | 370/466 |
| 6,636,529 B1 | * | 10/2003 | Goodman et al. | 370/469 |
| 6,658,002 B1 | * | 12/2003 | Ross et al. | 370/392 |

OTHER PUBLICATIONS

Pankaj K. Jha, Hybrid Data Transport Scheme Over Optical Networks, U.S. Appl. No. 09/523,476, filed Mar. 10, 2000.

Pankaj K. Jha, Hybrid Data Transport Scheme Over Optical Networks, U.S. Appl. No. 09/535,890, filed Mar. 27, 2000.

PPP over Simple Data Link (SDL) using SONET/SDH with ATM–like framing, By J. Carlson et al., May 2000.

A Simple Data Link Protocol for High–Speed Packet Networks, By Bharat T. Doshi et al., Bell Labs Technical Journal Jan.–Mar. 1999, pp. 85–104.

Protocols and Architectures for IP Optical Networking, By Jon Anderson et al., Bell Labs Technical Journal Jan.–Mar. 1999, pp. 105–124.

Internet Engineering Task Force Internet Draft, By Daniel O. Awduche et al., Nov. 1999, pp. 1–20.

PPP Extensions Working Group Internet Draft, By N. Jones et al., Jun. 2000, pp. 1–10.

Internet Engineering Task Force Internet Draft, By Dimitry Haskin et al., May 2000, pp. 1–9.

Network Working Group, By D. Grossman et al., Sep. 1999, pp. 1–23.

Internet Draft, By D. Tsiang et al., May 1, 2000, pp. 1–52.

Network Working Group, By A. Malis et al., Jun. 1999.

Cost–Effective Network Evolution, By Tsong–Ho Wu, IEEE Communications Magazine, Sep. 1993, pp. 64–73.

* cited by examiner

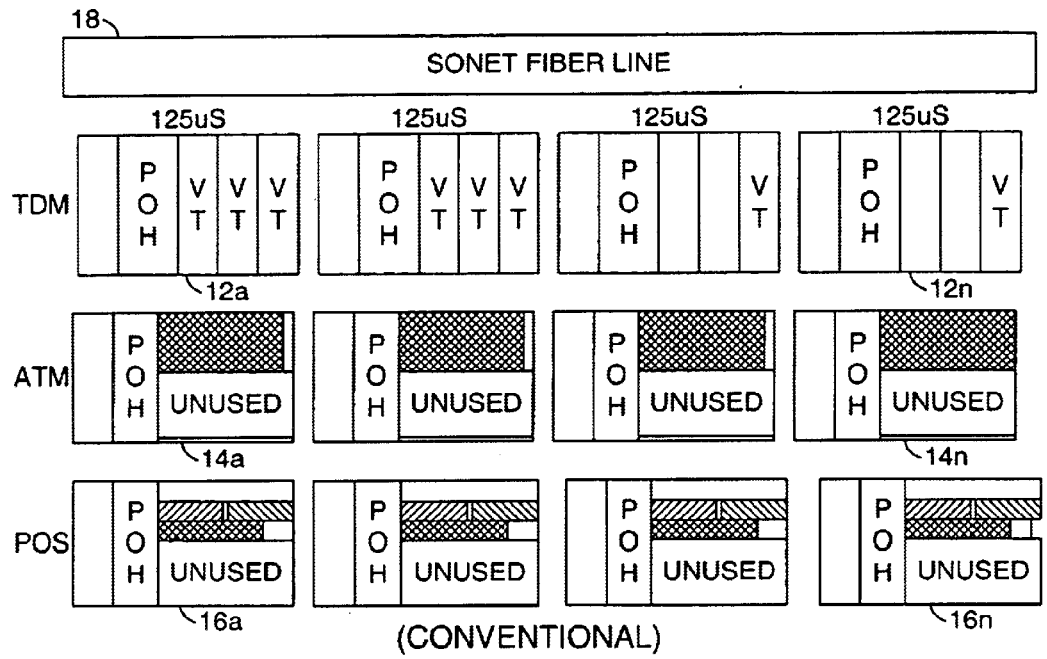
(CONVENTIONAL)
FIG. 1
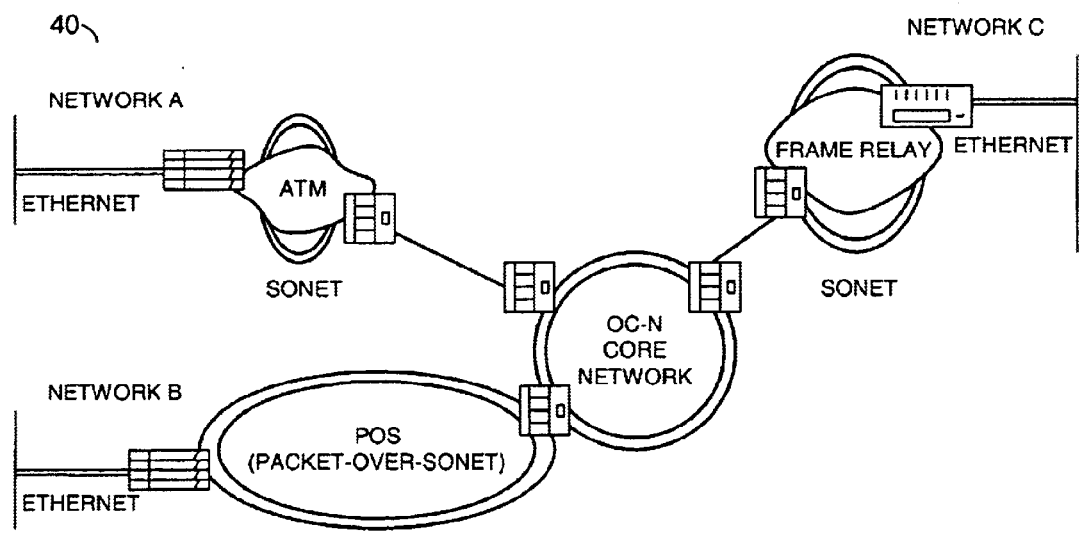
(CONVENTIONAL)
FIG. 2

| 152 | 154 | 156 | | 158 | 160 | 162 | 164 |
|---|---|---|---|---|---|---|---|
| PACKET IDENTIFICATION | MPLS LABELS | LAYER 2 ADDRESSES | | DATA IDENTIFIER | LAYER 3 ADDRESSES | USER DATA | ERROR DETECTION |
| IDENTIFY THE KIND OF PACKET BEING CARRIED (ETHERNET, PPP, FRAME RELAY, ETC.) | ONE OR MORE 32-BIT WORDS | DESTINATION MAC (6 BYTES) | SOURCE MAC (6 BYTES) | PROTOCOL IDENTIFIER OR IEEE802.3 LENGTH FIELD (2 BYTES) | ...NETWORK LAYER ADDRESSES... | ..PAYLOAD.. | CRC |

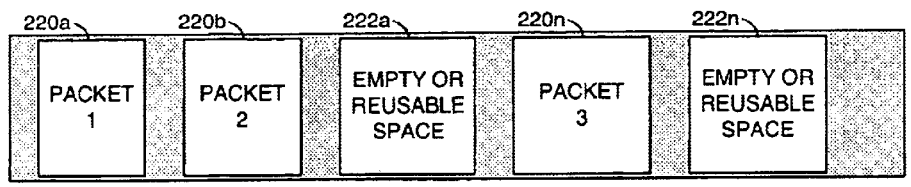

FIG. 7

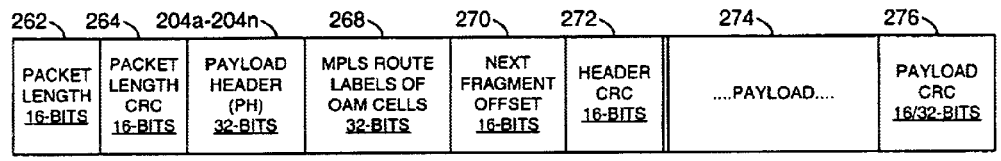

| 292 | 290 | 288 | 286 | 284 | 282 | 280 |
|---|---|---|---|---|---|---|
| UNUSED D31:D20 | PADDING D18:D19 | FRAGMENT ID D17:D16 | HEADER LENGTH D15:D8 | PACKET REUSE D7 | HEADER DATA D6:D4 | PACKET IDENTIFIER D3:D0 |
| RESERVED FOR FUTURE USE | 00 : NO PAD<br>01 : 1-BYTE PAD<br>10 : 2-BYTE PAD<br>11 : 3-BYTE PAD | 00 NO FRAG.<br>01 INITIAL PKT<br>10 CONT. PKT<br>11 END PKT | LENGTH OF HEADER BYTES | 0 NO<br>1 YES | 000 NONE<br>001 MPLS<br>010 OAM<br>011- (FUTURE<br>111 USE) | 0000 NULL PACKET<br>0001 ATM CELLS<br>0010 PPP<br>0011 IP<br>0100 ETHERNET<br>0101 PDH<br>0111 (FUTURE USE)<br>-<br>1111 |

FIG. 9

HYBRID DATA TRANSPORT SCHEME OVER OPTICAL NETWORKS

CROSS REFERENCE TO RELATED APPLICATIONS

This application claims the benefit of U.S. Provisional Application No. 60/184,264, filed Feb. 23, 2000, which is hereby incorporated by reference in its entirety.

The present application may relate to U.S. Ser. No. 09/523,576, filed Mar. 10, 2000, U.S. Ser. No. 09/523,476, filed Mar. 10, 2000, U.S. Ser. No. 09/535,717, filed Mar. 27, 2000, and U.S. Ser. No. 09/535,890, filed Mar. 27, 2000, which are hereby incorporated by reference in their entirety.

FIELD OF THE INVENTION

The present invention relates to a method and/or architecture for hybrid data transportation generally and, more particularly, to sending a mix of different data types over a fiber optic network running SONET/SDH framing.

BACKGROUND OF THE INVENTION

Long distance and metropolitan area network (MAN) communications rely on short-haul and long haul fiber optic networks to transport data and telephony traffic. One conventional way to transmit data in fiber networks is through a Synchronous Optical Network/Synchronous Digital Hierarchy (SONET/SDH) protocol. In a SONET/SDH network, data travels in fixed size envelopes that repeat every 125 microseconds. With this synchronous fixed-length framing, every byte (e.g., 8 bits of data) inside a SONET/SDH frame represents a 64 Kbps (64000 bits/sec) channel. The 64 Kbps channel has the same rate as supported by current telephone channels (also called DS0 channels).

SONET was designed to efficiently carry telephony Plesiochronous Digital Hierarchy (PDH) channels such as T1/T3. This was easily achieved by dividing the payload area in fixed slots called virtual tributaries (VT). These virtual tributaries are then grouped together to form higher-rate channels. These fixed slots are efficient for carrying fixed-bandwidth telephony channels because any one or more channels can be added or removed from a bundle without processing an entire payload of channels. Because SONET frames repeat at fixed intervals, these virtual tributaries have fixed locations and time intervals, and it is easy to extract T1/T3 or fractions of T1 without processing the entire SONET payload.

With growing volume in data traffic, however, SONET/SDH networks must now carry a significantly large number of data packets—such as ATM (Asynchronous Transfer Mode—53 bytes each) and IP (Internet Protocol—variable-size packets) in addition to traditional T1/T3 channels. The synchronous framing structure of SONET/SDH that is quite efficient for carrying T1/T3 channels is not able to carry both fixed-bandwidth and variable-bandwidth channels in an optimum way.

SONET/SDH has an inefficient utilization of fiber bandwidth for data packets. For data transport, some of the virtual tributaries are created for transporting fixed-bandwidth T1 traffic while others are used for transporting packet data packets such as ATM and IP. Since an individual virtual tributary has a limited bandwidth, extra mechanisms have to be used for sending data packets of higher bandwidth using virtual tributaries.

In one technique, a 10 Mbps data packet channel, for example, is inverse-multiplexed into smaller bandwidth streams and then sent on many virtual tributaries. At the other end, these streams are integrated to reconstruct the full 10 Mbps channel. In another method, many of the virtual tributaries are concatenated using hardware to create a higher-bandwidth virtual tributary for transmitting the high-bandwidth data packet.

SONET/SDH lacks of support for data mixing. A SONET fiber link carrying frames containing ATM cells cannot carry POS, because ATM cells frequently carry QoS-sensitive data such as CES (Circuit Emulation Service) or multimedia traffic. Introduction of SONET frames containing POS will cause significant delays (e.g., 125 $\mu$S for each POS frame inserted in the link).

In each of these methods, a unique Path Signal Label (PSL) value in the POH (Path Over-Head) field of the SONET frame identifies the type of data transmission inside the payload. The payload area is also referred to as SPE (Synchronous Payload Envelope). Because a PSL value identifies contents of the entire SONET payload envelope, only one type of transmission can be supported at a time in a SONET frame.

One method for data transmission is to use the entire SONET SPE for data packets. The SONET payload area is filled with IP packets using Packet-over-SONET (POS) packets. POS packets are packets by 0x7E (Hexadecimal) at both ends of a packet, with a framing using PPP (Point-to-Point Protocol). Many packets can be put inside a single SONET SPE. This method can only support variable-length packet protocol such as IP. A SONET fiber containing these packets cannot transport T1/T3 channels or real-time streams using ATM cells. The reason for this limitation is that each SONET SPE containing IP packets, for example, introduces a delay of 125 microseconds. Such a delay is not acceptable for T1/T3 circuits or real-time streams using ATM cells.

Another method for data transmission is to use the entire SONET SPE for ATM cells. In this case, a SONET SPE is filled with ATM Cells. ATM cells are delimited by their fixed length, and are tracked by doing a hunt for their header checksum byte. Services such as T1, Frame Relay, Ethernet, etc. are transported over ATM using standard protocols. This requires complex implementations in hardware and incorporation of ATM service interworking at each service boundary.

Another method for data transmission is to use the virtual tributaries (VT) for data packets and ATM cells. In this method, a SONET SPE is partitioned in many fixed-bandwidth slots called virtual tributaries (VT). For data transport, some of these virtual tributaries may contain T1/T3 type of fixed-bandwidth traffic while others are used for transporting packet data packets such as ATM and IP.

Since an individual virtual tributary has a limited bandwidth, extra mechanisms have to be used for sending data packets of higher bandwidth using virtual tributaries. In one technique, a 10 Mbps data packet channel, for example, is inverse-multiplexed into smaller bandwidth streams and then sent on many virtual tributaries. At the other end, these streams are integrated to reconstruct the full 10 Mbps channel. In another method, many of the virtual tributaries are concatenated using hardware to create a higher-bandwidth virtual tributary for transmitting the high-bandwidth data packet.

Each of these methods uses a fixed-bandwidth channel or a set of channels for transmitting network data packets. In each method, bandwidth capacity of the fiber is poorly utilized since network data packets are bursty in nature and average bandwidth utilization is quite low.

Referring to FIG. 1, examples of various data types are shown. A set of time-division-multiplexed (TDM) packets 12a–12n, a set of ATM packets 14a–14n and a set of POS packets 16a–16n are shown in connection with a SONET fiber line 18. In a SONET network, only one type of data can be transferred at a time. The data is identified by a unique PSL (path signal label) byte value inside a Path Over-Head (POH) of the TDM packets 12a–12n, the ATM packets 14a–14n, the POS packets 16a–16n, of PDH traffic. The nodes at different points in the SONET fiber line 18 have different types of data to send on the network.

Conventional data communication networks follow a 7-layer stack of OSI (Open Systems Interface) where packets are sent from node to node using a link layer addressing (i.e., layer 2). A physical layer (i.e., layer 1) determines the physical interface for transport. The layer 2 address for Ethernet, for example, is a 6-byte value called MAC (Media Access Control). For ATM (Asynchronous Transfer Mode) a 53-byte cell is used for framing. The ATM cell contains a VPI (Virtual Path Identifier) and VCI (Virtual Connection Identifier) that are used for link layer addressing (layer 2).

For efficient routing and networking topology efficiency, a higher layer of addressing (called layer 3, or network layer) is needed. This is usually done for IP (Internet Protocol) or similar other protocols.

Nodes on a network use layer 2 addresses to connect to each other, then parse the layer 3 addresses (such as IP addresses) and headers. The layer 3 parsing determines network topology before deciding which route to send the packets. Such parsing is often time-consuming and requires processing by microprocessors and other pieces of hardware logic.

MPLS (Multi-Protocol Label Switching) is a technique where routes that a packet move through are assigned a series of labels (e.g., 20 bits each out of a 32-bit value). The labels are also referred to as route tags. The labels are inserted between layer 2 (address values for Ethernet frames) and layer 3. (network layer values in PPP frames). These labels are changed, added or dropped as the packet travels from node to node. Using MPLS, intermediate nodes simply look at a label value, consult an internal table to determine where to forward the values, and then send the packet out. Using MPLS, intermediate nodes do not have to look at layer 3 values, which results in increased performance.

The MPLS specification provides for MPLS labels that are carried inside a packet. A special protocol identifier declares the existence of the MPLS labels. In an Ethernet network, MPLS labels are inserted after MAC addresses (and before network layer addresses start).

In Ethernet networks, user data is encapsulated with layer 3 (network layer) addresses, MPLS labels (optional), and layer 2 (data link) addresses as prefixes. The user data is followed by a 16/32-byte Cyclic Redundancy Check (CRC) value. The header CRC field is inserted after the MPLS labels, but before the user data, as shown by the following TABLE 1:

TABLE 1

| Layer 2 Addresses | | Data Identifier | MPLS Labels | Layer 3 addresses | User Data | Error Detection |
|---|---|---|---|---|---|---|
| Destination MAC (6 bytes) | Source MAC (6 bytes) | Protocol Identifier or IEEE802.3 Length Field (2 bytes) | One or more 32-bit words | ... Network Layer addresses ... | Payload | CRC |

For wide area network (WAN) communications, another protocol Point-to-Point Protocol (PPP) is used. Similar to Ethernet, MPLS labels are inserted between PPP protocol identifiers and user data, as shown by the following TABLE 2:

TABLE 2

| Frame Boundary | Address | Control Word | PPP Identifier, etc. | MPLS Labels | User Data | Error Detection | Frame Boundary |
|---|---|---|---|---|---|---|---|
| 0111 1110 | Address | Control | PPP Network ID | One or more 32-bit words | Payload | CRC | 0111 1110 |

As a packet goes through a network, intermediate nodes identify whether MPLS labels are embedded in the packet. For example, the following steps describe such an operation for Ethernet and PPP protocols:

(i) check the type of the port from which the packet was received;

(ii) for Ethernet, use MAC address comparing logic to look past the first two fields (i.e., source and destination MAC addresses). For PPP, look past the address and control fields to read the protocol identifier to determine the presence of an MPLS ID value;

(iii) check the MPLS protocol ID (identifier). If the ID is present, MPLS labels are inserted between layer 2 and layer 3 addresses;

(iv) consult an MPLS label lookup table to determine how to process the packet. Check to see if the top label value has to be swapped with a new label, removed from the label list, or if a new label has to be added;

(v) recompute CRC on the packet since the MPLS value has changed;

(vi) send the packet from an output port determined by the MPLS label lookup table; and (vii) if the output port type is different from input port type, reformat the frame for the protocol supported on the output port.

Referring to FIG. 2, an example of an optical network with multiple protocol end-points 40 is shown. Limitations of current MPLS framing for optical networks are illustrated. While it is essential to have layer 2 addressing preceding all other bytes on the legacy networks such as Ethernet, ATM, and Frame Relay, having such an architecture for optical networking nodes that interconnect different networks is quite expensive and unnecessary.

Consider MPLS is used for label switching packets from network A to network B or network C. Protocol awareness and packet frame conversions are required at every interconnecting node. For example, the router on network A participates with other routers on the network in MPLS label assignments. The router adds labels on the Ethernet packets coming from network A, before sending them on the ATM network. If the packet must go through ATM or frame relay networks protocol conversions are necessary. Additionally, MPLS assignments using current framing mechanism are necessary.

When MPLS is used for packet switching across optical networks (such as SONET rings having intermediate nodes) each intermediate node must have extra logic to process the layer 2 headers and the understand specific MPLS labeling. Such processing must be performed for MPLS switching to send each packet. Such processing for every packet on an optical network requires both hardware and software logic for network packet processing at every optical node. Such logic is not only expensive, but can also severely limit packet-processing performance.

Various conventional protocols have been developed to improve bandwidth usage by attempting to partially solve two problems in SONET networking (i) lack of support for data mixing, and (ii) bandwidth reuse limitations. Such conventional protocols have been partially able to achieve additional bandwidth either by creating fatter pipes with VT, by filling payloads with ATM cells carrying different types of data, or by using SONET link as a multi-node access network using Ethernet framing for data packets.

While virtual tributaries provide an efficient way to transport PDH traffic, allocation of bandwidth for LAN data such as 10/100 Mbps using a SONET fiber containing T1 traffic becomes difficult. To support 10 Mbps through Virtual tributaries one has to either dedicate an entire STS-1 (51 Mbps) frame, or use several virtual tributary channels and to perform inverse multiplexing.

Virtual concatenation concatenates several VT channels into bigger virtual pipes to carry higher bandwidth traffic. With such a protocol, while some virtual tributaries carry T1/T3 data as usual, others are concatenated for transport of higher bandwidth data traffic such as 10/100 Mbps links.

However, virtual concatenation allocates a fixed bandwidth for LAN. Virtual tributaries cannot dynamically adjust bandwidth usage on a packet-by-packet basis. While it is possible to change the concatenated bandwidth through software, such an implementation does not yield much for bandwidth utilization. Bursty LAN traffic bandwidth usage is typically quite low, resulting in significant waste when used over a fixed bandwidth virtual pipe (average use of a 10 Mbps link is 20%, and if an entire STS-1 is used the efficiency becomes about 4%). Another problem with virtual concatenation is that while one virtual pipe may be overloaded with traffic, others may be underutilized. Virtual concatenation cannot dynamically adjust network loads on different channels.

Another conventional approach to increase the utilization of SONET bandwidth is to fill the payload area with ATM cells using a technique known as ATM VP (Virtual Path) multiplexing. ATM VP multiplexing encodes packets in ATM cells and then inserts the cells inside a SONET SPE. The ATM VP multiplexer typically utilizes CES to carry DS0/1 PDH traffic.

However, operations, administration and maintenance (OAM) operations of ATM network are different from that of SONET, and management of the two protocols can become difficult. Similarly, ATM network routing and switch-to-switch signaling data paths are different from IP network routes, resulting in network operational complexity.

Network traffic statistics monitoring has shown that a significant percentage (about 45%) of network traffic comprises IP packets with small packet sizes (e.g., around 40 bytes). With IP over ATM (rfc2684—Multiprotocol Encapsulation over ATM AAL5) payload size slightly exceeds what can fit inside a single ATM cell. Such an arrangement results in transmission of two ATM cells, with the second cell that is mostly ATM overhead and stuffing bytes. This, with other ATM overheads, means having to allocate extra SONET bandwidth for IP transport if ATM is used as a transport protocol.

In addition, using ATM for sending different services requires implementation of ATM transport protocols and interworking for all related protocols (such as IP-over-ATM, Frame Relay-ATM Internetworking, circuit emulation, etc.) in the device. Such implementation requires a high level of complexity in hardware and software, resulting in higher costs of manufacturing and operation of networks.

Such conventional network architectures are not efficient for transmitting variable-length IP packets that form the majority of data network traffic on the Internet. Data network traffic comprises variable-length IP packets and fixed-length ATM cells (i.e., 53 bytes).

As more and more data is being transported on SONET/SDH rings, there is a need to send variable-length packets on pre-existing SONET/SDH networks. These packets originate out of routers and other data access devices. While SONET/SDH networks must transport these data packets, they must also continue to support TDM-style fixed length packets for telephony and leased line applications.

Conventional approaches cannot mix POS with ATM cells in a single SONET SPE. Conventional approaches do not leave some area of the SONET SPE reserved for VTs and others for POS and/or ATM cells.

Limitations of conventional approaches include one or more of the following (i) inability to mix TDM channels with packet-oriented data over SONET/SDH rings due to timing constraints of the TDM channels without a fixed bandwidth virtual tributary mechanism and (ii) limiting data channels sent on fiber carrying T1 lines to Virtual tributaries (since virtual tributaries are of fixed bandwidth, this restriction limits data channels to fixed bandwidth operation).

Therefore, if a SONET SPE is carrying all ATM cells, it cannot carry IP variable-length packets, and vice versa. Such switches route all packets coming at one tributary to another until switching paths are changed through reprogramming.

Conventional approaches do not take into account network loading conditions and do not support dynamic bandwidth provisioning. Conventional approaches also have increased traffic on core links from too much concentration into too few links. Transporting IP traffic over virtual tributary channels that was originally designed for DS0/1/3 connectivity is inefficient. Because VT assignment is fixed, IP transport is not able to take advantage of total available SONET/SDH bandwidth.

In conventional approaches, IP packets are constrained to go through some pre-configured VT channels while other VT channels may be under-utilized. Once a VT channel is dedicated for a particular traffic and is put on a specific circuit-switched path, the topology does not change, even if traffic conditions change.

Conventional approaches have the following disadvantages (i) ATM and Packets are implemented on different rings because of QoS and timing issues; (ii) very high cost for new fiber and SONET equipment for Telco/ISP/MAN; (iii) only one type of packet goes inside a SONET SPE at one time (the remaining bytes of frame on SONET are wasted) (SONET packets go around the entire SONET ring, limiting bandwidth); and/or (iv) the only way to support telephony channels along with data packets is to allocated part of SONET frame for packet data transmissions (which results in an inefficient bandwidth usage).

SUMMARY OF THE INVENTION

One aspect of the present invention concerns a packet configured to transmit information via a network. The packet may comprise one or more labels configured to control routing of the packet and a payload.

Another aspect of the invention concerns an apparatus comprising one or more nodes configured to transfer one or more packets. Each of the packets may comprise one or more labels configured to control switching of the one or more packets and a payload. Each node may be configured to transmit and/or receive the one or more packets in response to the one or more labels.

The objects, features and advantages of the present invention include providing a method and/or architecture that may (i) provide a single SONET ring to carry one or more forms of data; (ii) allow a number of forms of data types to operate inside a single SONET SPE; (iii) provide bandwidth reuse at various nodes of a network, (iv) provide intermediate optical networking nodes that may not require additional hardware and/or software to understand and translate protocol formats for transporting packets, (v) allow network nodes to understand protocol frame formats before reading MPLS labels, (vi) allow SONET sub-sections to run at full speed, effectively boosting SONET bandwidth; and/or (vii) provide significant savings in optical networking equipment.

BRIEF DESCRIPTION OF THE DRAWINGS

These and other objects, features and advantages of the present invention will be apparent from the following detailed description and the appended claims and drawings in which:

FIG. 1 is a detailed block diagram of conventional fiber optics transmission data types;

FIG. 2 is a block diagram of a conventional optical network;

FIG. 7 is a detailed block diagram of a variable length envelope;

FIG. 8 is a detailed block diagram of a packet of FIG. 7;

FIG. 9 is a more detailed block diagram of a header of FIG. 8;

DETAILED DESCRIPTION OF THE PREFERRED EMBODIMENTS

The present invention may provide a Hybrid Data Transport (HDT) protocol that may allow transmission of fixed bandwidth channels (e.g., T1/T3), variable-bandwidth data sources (e.g., ATM), IP and any other protocol data in a single SONET frame using a single fiber network. The protocol of the present invention may work seamlessly across a mix of SONET and non-SONET networks, and may yield cost savings in fiber infrastructure, equipment, and operation.

With the use of the Hybrid Data Transport (HDT) protocol of the present invention, an existing fiber network may be fully utilized to transport a number of different types of traffic. The present invention may additionally dynamically. manage bandwidth usage on a packet-by-packet basis.

The present invention may provide spatial reuse of bandwidth, allocation of PDH bandwidth in 64 Kbps increments, protocol-independent MPLS (Multi-Protocol Label Switching) support, and/or seamless operation over point-to-point and ring networks with SONET/SDH, direct data-over-fiber configurations or other network configurations. The present invention may also be applicable to Synchronous Digital Hierarchy (SDH). However, SONET is used as a general description for SONET/SDH networks with similar implementation for SDH networks. Additional details of the operation of the HDT protocol are also described in connection with direct data-over-fiber networks.

Figure 3:
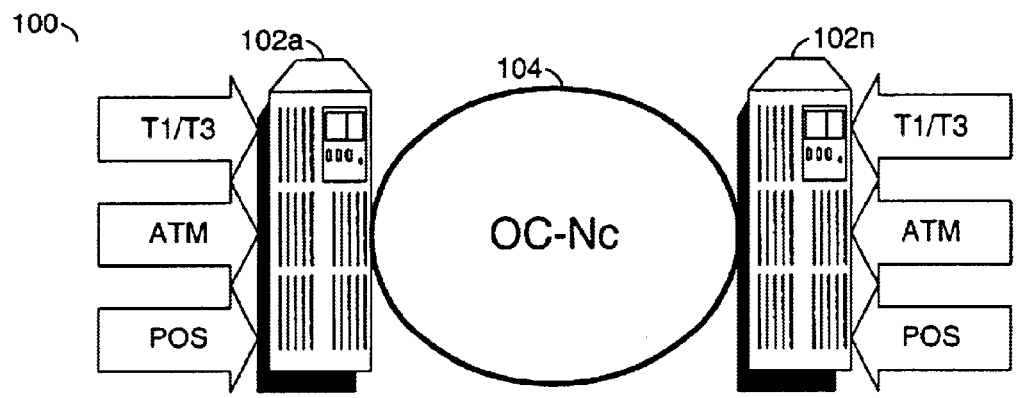
FIG. 3 is a block diagram of a preferred embodiment of the present invention.
Figure 4:
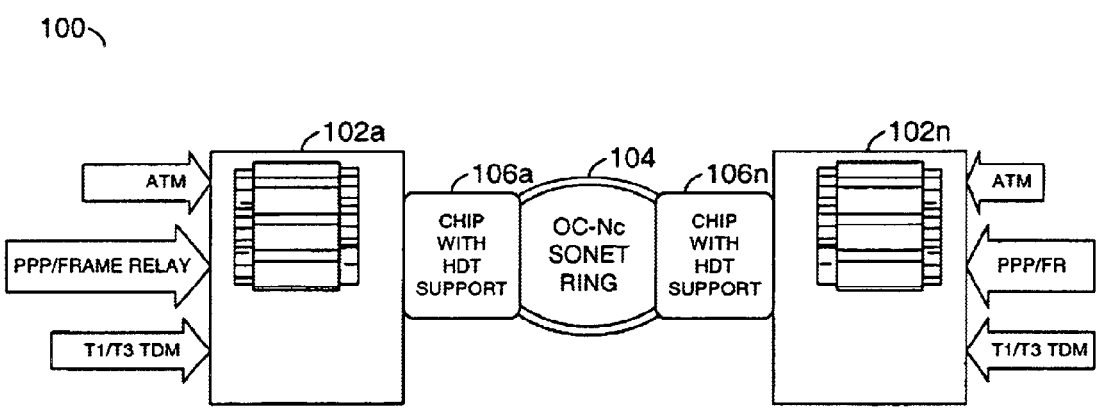
FIG. 4 is a more detailed block diagram of the circuit of FIG. 3.

Referring to FIG. 3, a block diagram of a system 100 is shown in accordance with a preferred embodiment of the present invention. A more detailed implementation of the system 100 is illustrated in FIG. 4. The system 100 may comprise a number of devices 102a–102n connected to a network backbone 104. FIG. 4 illustrates the addition of a number of chips 106a–106n. The device 102a–102n may receive T1/T3 signals, ATM signals, and POS signals. The device 102a–102n may receive data in one or more of the following data transmission media: SONET, SDH, direct data over fiber (e.g., both in point-to-point or ring configuration) with or without SONET/SDH framing and other transmission methods needed to meet the design criteria of a particular implementation.

The system 100 may provide an increase in the data traffic handling capabilities of SONET/SDH networks. The system 100 may implement a design of a SONET/SDH add/drop multiplexer (ADM) (and a SONET/SDH cross-connect) that may function on variable-length packets. With such an approach, IP (or other protocol) packets of different lengths may be (i) added to a SONET/SDH SPE and (ii) terminated at a different network node (e.g., device 102a–102n).

Figures 5, 6:
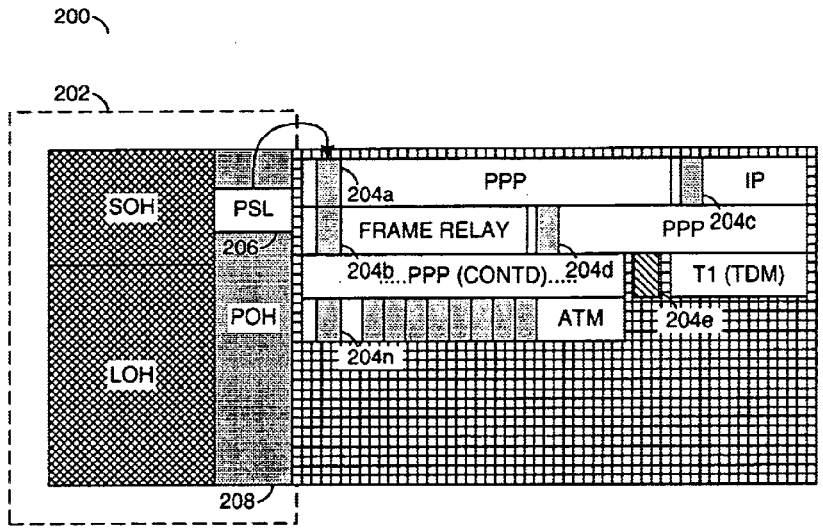
FIG. 5 is a block diagram of a HDT frame inside a SONET SPE.
FIG. 6 is a detailed block diagram of a protocol independent frame.

Referring to FIG. 5, a detailed block diagram of SONET/SDH payload envelope (SPE) 200 is shown. The present invention may embed a header (and/or footer) 202 (e.g., a 32-bit packet header) to create a deterministic packet transport protocol. The packet header may comprise a 32-bit payload header 204a–204n that may precede each frame, regardless of the particular packet type stored within the frame. The protocol identification may be implemented as a few header bits configured to denote the particular type of packet (e.g., ATM, IP, PPP, Frame Relay, etc.) embedded within the payload portion of a particular frame. Bandwidth maximization may be implemented with another bit in the header 202 that may specify whether the packet may be reused by the intermediate SONET nodes 102a–102n. The SONET framing may be left unchanged by implementing a single PSL (Path Signal Label) value 206 in a SONET Path Over Head (POH) 208 that is generally able to specify the various types of packets embedded within the payload of a particular frame. The system 100 may be directly applicable to WDM/DWDM Fiber because individual packet framing is independent of SONET. The system 100 may be also used in IP-over-Fiber networks.

Referring to FIG. 6, an example of a protocol-independent frame (or packet) 150 for transportation of MPLS labels is shown. The frame 150 may comprise an identification portion 152, a MPLS label portion 154, a layer 2 address portion 156, a data identifier portion 158, a layer 3 portion 160, a user payload portion 162 and a error detection portion 164. The MPLS label portion 154 may be used for switching packets at nodes and is not part of the payload. The MPLS label portion 154 may comprise one or more 32-bit words (MPLS labels). Implementing the MPLS labels 154 outside the payload may simplify node design.

The protocol independent frame 150 may be utilized by SONET/SDH and direct data-over-fiber networks. The protocol-independent frame 150 may be used with the Hybrid Data Transport previously described. The protocol-independent frame 150 may create an encapsulating frame for all types of packets. The MPLS label portion 154 generally precede any other information, such as the layer 2 and the layer 3 addresses 156 and 160 and the payload portion 162. The protocol-independent frame 150 may be used to implement high-speed switching logic at nodes without having to incorporate protocol-specific knowledge for each of the packets.

The protocol-independent frame 150 may provide modified encoding for packet transmission over optical networks. The packet identification portion 152 generally identifies the type of packet being carried in the frame 150, followed by the series of MPLS labels 154, if present.

In one implementation, all optical networking nodes may be designed with a simple MPLS switching logic (not shown), without the requirement of protocol awareness/conversion. Optical networking nodes may include a simple de-framing hardware logic for the MPLS labels 154. Layer 2 address portion 156 may not have significance at the entry/exit points of optical networks. The layer 2 address portion 156 may be implemented behind the packet identification portion 152. The packet identification portion 152 may tell what kind of packet is embedded in the frame 150 after the MPLS labels 154.

The MPLS labels 154 generally follow the packet identification portion 152, therefore, regardless of underlying protocol, an optical networking node may simply read the MPLS labels 154, use hardware/software logic to perform MPLS switching and forward the packet to the next network. Intermediate optical networking nodes may not need to understand and translate protocol formats for transporting packets. An optical networking node interfacing ATM, frame relay, and Packet-over-SONET protocols may not need to process protocol frames when using MPLS for switching packets across ports.

The present invention may provide significant saving in optical networking equipment because such equipment does not require high-speed protocol-sensitive hardware to process packets and protocol identification in order to access the MPLS labels. The same MPLS switching engine may be implemented at all optical networking nodes without regard to the types of networking protocols supported.

The SONET/SDH payload envelope 200 (e.g., transmitted every 125 µs) divided into variable length packets is shown. The header 202 may comprise one or more of the following parameters: (i) packet length, (ii) length of CRC (Cyclic Redundancy Check), (iii) payload identifier header to describe the nature of packet, (iv) route labels that may help route packet inside network, (v) payload header CRC, (vi) actual payload, and/or (vii) payloads CRC.

In SONET, a basic unit of transmission is a Synchronous Transport Signal Level 1 (STS-1) or Optical Carrier Level 1 (OC1) signal. Both operate at 51.84 Mbit/s. STS-1 describes electrical signals, and OC1 refers to the same traffic after being converted into optical signals. SONET also allows channels to be multiplexed. An OC12 circuit, for instance, may carry traffic from four OC3 links. An OC12 circuit may also carry a single channel, in which case the line is said to be concatenated. Such circuits may be described as OC3c, OC12c, and so on.

Another protocol similar to SONET is Synchronous Digital Hierarchy (SDH), defined by the ITU (International Telecommunication Union) as G.707 (shortly after ANSI formally ratified the T.105 spec for SONET). Although interconnection of SONET and SDH networks may be relatively rare, several new transoceanic telecommunications projects make use of such links.

The system 100 may maximize fiber bandwidth by implementing the Hybrid Data Transport (HDT) Protocol. The HDT protocol may allow dynamic management of packets to maximize bandwidth. The system 100 may allow the transport of different types of data over a single fiber link. With the system 100, IP (or other protocol) packets, Packet-Over-SONET (POS), ATM cells, G.702-based PDH (T1/T3), SRP, Frame Relay, and other types of data may be mixed inside a SONET payload and dynamically and sent on a single fiber (as shown in FIGS. 5 and 6). The system 100 may provide robust scrambling and unified packet transport over ring and point-to-point networks and may be well suited for non-SONET configurations such as point-to-point WDM networks. The SONET SPE 200 may be filled with HDT frames that may carry a wide mix of fixed and variable bandwidth data. The Simple Data Link (SDL) framing protocol prefixes a payload with a 32-bit word, 16 bits of which hold the length of the packet and the other 16 bits contain CRC (Cyclic Redundancy Check) for the length field. SDL may provide a robust CRC-16 based framed boundary delineation mechanism compared to hybrid mix of point-to-point and ring topologies.

The system 100 may implement a single fiber link that may be used for sending different kinds of traffic to use the full capacity of the link. The system 100 may allow VT or sub-VT channels to be eliminated. ATM cells, IP (and other protocols) packets, PPP, frame relay, NXDS0, T1/T3 and others may be mixed inside SPE on a packet-by-packet basis.

PDH channels (such as T1/T3) may be dynamically allocated anywhere inside SONET payload in 64 Kbps bandwidth increments. Bandwidth may be reusable in fine granularity in 64 Kbps increments, with any type of data. For example, an IP packet may be dropped at a node (e.g., B) where the node B may reuse the packet area for inserting ATM cells, frame relay, PDH traffic, or any other data type.

The system 100 may transport many packets of one or more different data types. The particular type of data may be placed inside a single SONET SPE or data-over-fiber frame while preserving time dependency of data packets, such as PDH. The system 100 may be implemented without terminating the whole link capacity at each node. Destination nodes may indicate a start of the packet inside a SONET payload. Other packets may pass through the node.

Direct data-over-fiber configurations (e.g., without SONET framing) may be easily supported with full link monitoring and management. Support may also be provided for variable-size packet SONET add/drop multiplexer (SONET ADM) devices. Variable-size packets may be transported inside a SONET SPE and nodes may cross-connect and add/drop the packets on different ports.

The system 100 may provide protocol-independent transport of MPLS labels. The HDT may provide for transmission of MPLS labels outside of protocol frame (rather than embedding such labels between data link and network layers as in conventional approaches). Intermediate SONET and optical fiber nodes may be used to create switching and add/drop systems without having to become protocol-aware.

With provision for MPLS labels transported outside of packets, the HDT may allow setting up of fast-reroute fail-switchover paths over a hybrid of ring and point-to-point networks using MPLS labels, without requiring nodes to be protocol-sensitive. Such an implementation may eliminate the need to provision and reserve completely unused backup paths on SONET rings.

In operation, the payload headers 204a–204n may precede every packet to carry the information to support HDT. A uniform structure of the header across a variety of packet types generally simplifies design of optical nodes for packet processing for both SONET and direct data-over-fiber networks. The headers 204a–204n may also contain a reusability bit that is set by the sending node. If the reusability bit is cleared, a destination node may reset the data identification bits to free up the packet area for reuse by new data packet. The packet area may be reused at either at the destination node or other downstream nodes.

By using the payload header 204a–204n to identify the type of a packet, the HDT is generally able to extend data identification beyond PSL-based SPE-level data typing and put multiple data types inside a SONET SPE. A value of 0000 may indicate the packet area (e.g., the length of the packet area is given by the length value in the outside SDL framing) that does not generally contain any useful data and can be reused for storing new data. HDT may easily support traditional PDH and other guaranteed bandwidth channels. In SONET networks, a frame repeats every 125 μS, resulting in a bandwidth of 64 KHz for every byte in the payload. By fixing the starting location of some packets inside the SONET frame, slots may be created for sending TDM-style traffic. Because the packet length is changeable in one-byte increments, such slots may be created in increments of 64 KHz. Because packets are dynamically created, fixed bandwidth channels may be created on the fly by clearing the reusability bit in the payload header.

Referring to FIG. 7, a detailed block diagram of the SONET SPE 200 is shown. The SONET SPE 200 may comprise a number of packets 220a–220n and a number of empty packets 222a–222n. The packet payload header 204a of the packet 220a may identify the packet/protocol. The packet payload header 204a may identify a packet type of the packet 220a stored (or transported). The payload header 204a may tell what kind of packet/protocol (such as Ethernet, PPP, IP, Frame Relay, ATM cells, T1, etc.) is inside a payload of the packet 220a. Different protocols may be supported at two ends (e.g., the device 102a–102n) of a network without the need for provisioning in advance. In contrast, conventional approaches use a protocol over WAN which is usually negotiated between two parties at the ends device 102a–102n of the WAN link.

The payload header 204a may be used to tell whether one or more of the empty packets 222a–222n inside the SONET SPE 200 may be reused at an intermediate node. In contrast, in conventional SONET networks, the entire SONET SPE 200 travels around the ring until removed by the sender. With the system 100, a receiver may mark the SONET SPE 200 as reusable. Nodes on the fiber network 100 may mark different sections of the SONET SPE 200 as reusable by the other nodes 102a–102n.

Provisioning of TDM channels may provide the ability to mark a portion (or many portions) of a SONET SPE payload area as non-reusable. With a non-reusable area, even when a receiver receives the packet, another receiver cannot reuse the packet area. However, the same receiver may reuse the non-reusable area.

In general, there is no limit to the order and manner of packet positioning. Any packet may be marked in any fashion to support, for example, a dynamic mix of data and voice (TDM) traffic on a SONET/SDH network. Such an implementation is not possible with current technologies. The present invention may solve the problem of mixed value and data transmissions faced by telephone carriers and data providers.

As SONET frames containing fixed bandwidth channels move around the ring, intermediate nodes may detect these packets (e.g., the reusability bit is reset), note the offsets of these packets, and preserve the respective offsets when recreating the frame (e.g., after adding packets from local input ports) for outbound traffic.

Referring to FIG. 8, a detailed example of a packet is shown. An SDL framing 262 may be in the first 16 bits and may contain the length of the entire payload, including SDL framing bytes. A 16 bits of CRC-16 264 may be provided on the length field (e.g., x16+x12+x5+1). The payload header 204a–204n may be a 32-bit word, followed optionally by an OAM bytes or MPLS labels 268. MPLS/OAM bytes may be variable number of MPLS labels or OAM values that may be transmitted in the header area of HDT, outside of payload. A next fragment offset 270 may be a 16-bit value showing the location offset of next packet fragment (if any) of the packet. The next fragment offset 270 is generally taken from the start of current packet. A header CRC 272 may be computed over payload header bytes only, with same scrambling polynomial used for SDL framing. A payload area 274 may contain the actual packet to be transmitted over the WDM or SONET link. The payload area 274 may contain one of a number of types of protocol packets, such as Ethernet, ATM, GR.702, PPP, Frame Relay, etc. A payload CRC 276 may be user-controlled value and may be computed for the payload bytes only. The payload CRC 276 is generally either a 16 or 32-bit value, depending on mutual negotiation between sending and receiving stations.

Referring to FIG. 9, various parameters of the packet header 204a are shown. The particular bit width of the payload header 204a may be varied accordingly to meet the design criteria of a particular implementation. A packet identifier 280 (e.g., D3: D0) generally identifies the type of packet in the payload. For example, value of 0000 may represent a null packet. A null packet may indicate that the payload area may be reused. When a packet is dropped at a node, the length field does not generally need to be modified for the packet, only the D3:D0 bits need to be cleared.

A header data area 282 may carry MPLS labels (e.g., outside of payload area). Operation administration and maintenance (OAM) bytes 282 may be used for link management, or any other data separately from the payload. A reusability area 284 (e.g., D7) may be a "1". If a SONET node can reuse a particular packet area, the size of the packet area may be given by the packet length field 264 of the SDL header. If the bit D7 is set to a "0", then a node will not generally mark the packet area as re-usable, even after a packet has been dropped. The particular nodes of the various configuration bits may be varied (e.g., inverted) accordingly to meet the design criteria of a particular implementation.

A header length area 286 (e.g., D15:D8) may include, in one example, a 32-bit payload header. A fragment identifier area 288 (e.g., D17:D16) may be implemented as a two word value. A value of 00 may indicate that the payload area contains a complete packet. A value of 01 may indicate the beginning packet of a fragmentation sequence. A value of 10 may indicate a continuation of packets. A value of 11 may mark the last fragment in the series. Other particular bit patterns may be implemented accordingly to meet the design criteria of a particular implementation.

A padding area 290 (e.g., D18:D19) may indicate a minimum packet length. In one example, the minimum packet length may be 4 bytes (e.g., 2 bytes length+2 bytes CRC). Idle bytes at the end of packets and elsewhere may be marked by a length field of "0000". In instances there may be less than 4 bytes left between packets. In this case, it may be impossible to place a SDL null packet. Such idle bytes are shown as tail-end padding for the preceding packet. An unused area 292 (e.g., D31:20) may be used for additional expansion.

Figure 10:
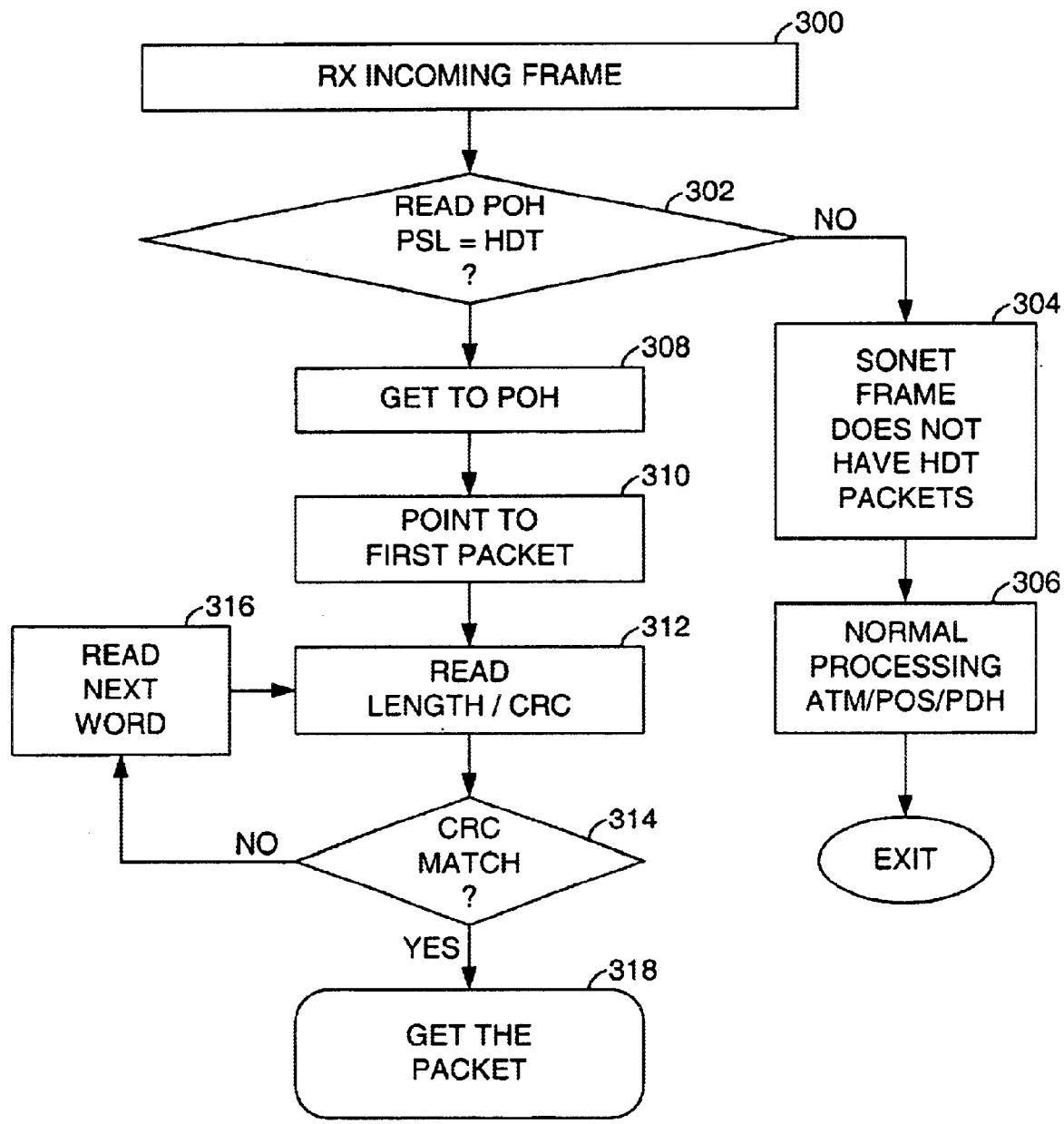
FIG. 10 is a flow chart illustrating an operation of the present invention.

Referring to FIG. 10, an example of a receive operation is shown. A node may receive a frame at a block 300. A block 302 may determine if the received frame is an HDT frame. The block 302 may use the PSL value in the POH to determine the type of protocol carried inside the SPE. If the PSL shows POS, ATM, or PDH traffic, the receive operation may proceed to the block 304. If no HDT packets are present, a block 306 handles the POS/ATM/PDH packet. If in the block 302, the PSL shows the SPE contains HDT frames, the node uses additional logic for HDT processing to detect and route different types of packets embedded in the SONET SPE 200.

A block 308 may read the POH. A block 310 may determine a first packet of the SONET SPE 200. A block 312 may read a length and CRC of the first packet. A block 314 may determine a match of the length and the CRC. If a non-match of the length and CRC occurs, the receive operation is generally set to a block 316. The block 316 may read a next word of the packet from the SONET SPE 318. If a match occurs, the receive operation may process the packet. Once the payload header has been processed and different packet types are been processed and different packet types are identified, hardware (e.g., implemented in the system 100) may use header fields to retrieve the payload and use usual hardware blocks for processing.

ATM cells are generally retrieved by first looking at the PSL value to determine their presence and then reaching the SONET SPE to get fixed byte ATM cells, either with or without HEC-based cell delineation. For example, if the payload header in the HDT shows the payload contains ATM cells, the hardware device generally retrieves payload bytes (up to number of bytes specified in length field) and sends the byte stream to an existing ATM cell processing logic. The ATM cell processing logic may then work on the byte stream using HEC hunting just as if the SPE contained only ATM cells in its payload.

Figure 11:
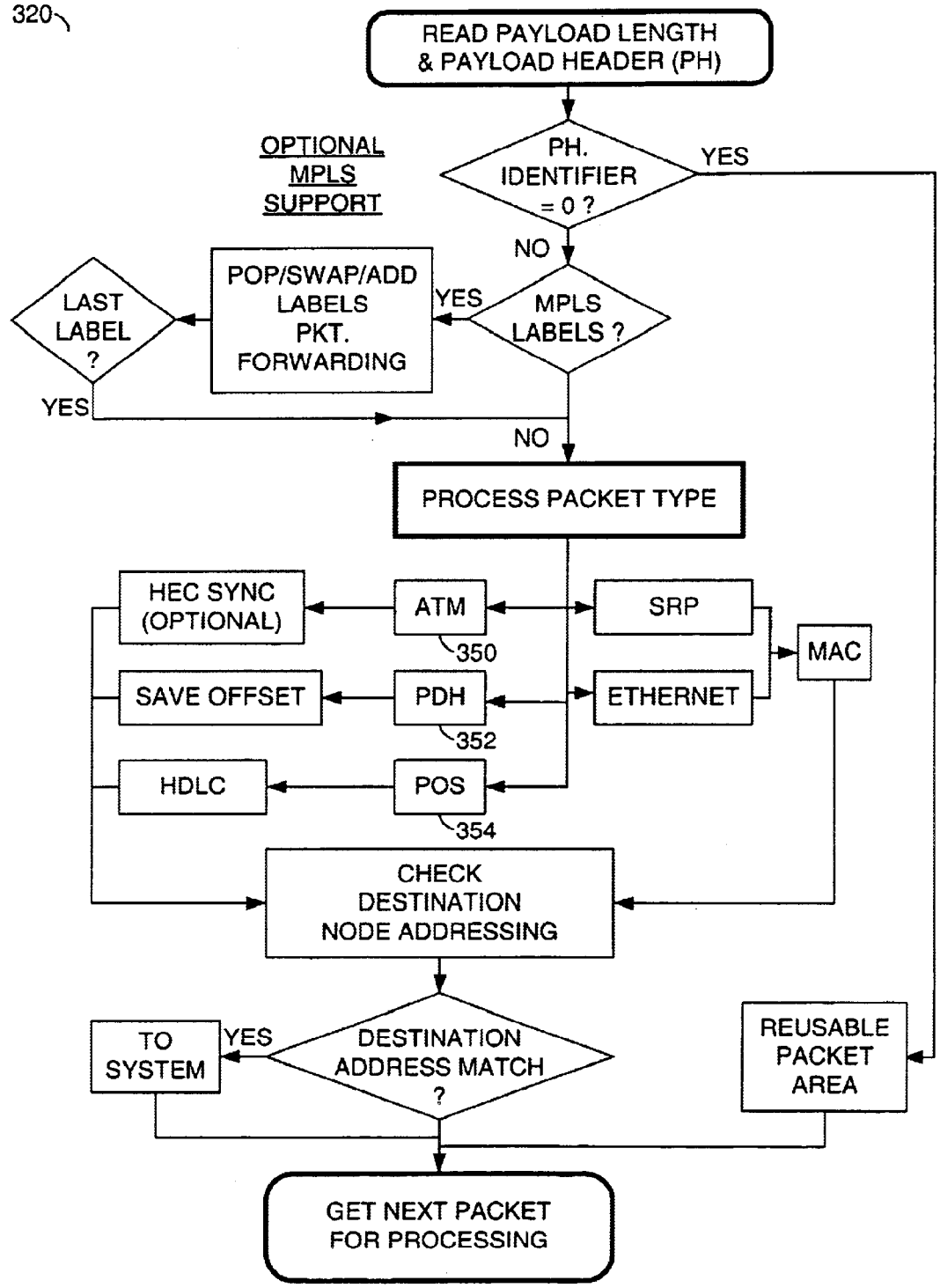
FIG. 11 is a flow chart illustrating an operation of the present invention.

Referring to FIG. 11, an example of a processing operation 320 is shown. A device supporting Hybrid Data Transport HDT protocol generally operates much the same as a normal SONET/SDH transport operates. Operations for processing ATM cells, POS, and PDH protocols are the same and illustrated as processing blocks 350, 352 and 354. HDT adds a header to packets to allow their mixing within the same SPE 200. Much of the HDT processing is generally related to processing of the header to identify the type of packet and then passing the starting address of data bytes to standard logic for handling the individual packet type. Support of PDH-type channel typically requires a fixed starting location for the channel in every frame. If PDH support is not needed, packets of any mix may be put anywhere inside the SPE 200 to achieve excellent bandwidth utilization without much operational complexity. When fixed bandwidth channels are carried, some data packets may need to be fragmented when the packet hit a static location. Fragmentation of a packet, however, is generally easily achieved in SONET networking because all bytes in the SPE 200 are transmitted sequentially. Additionally, recovering fragments and putting the fragment together may be simply accomplished.

Figure 12:
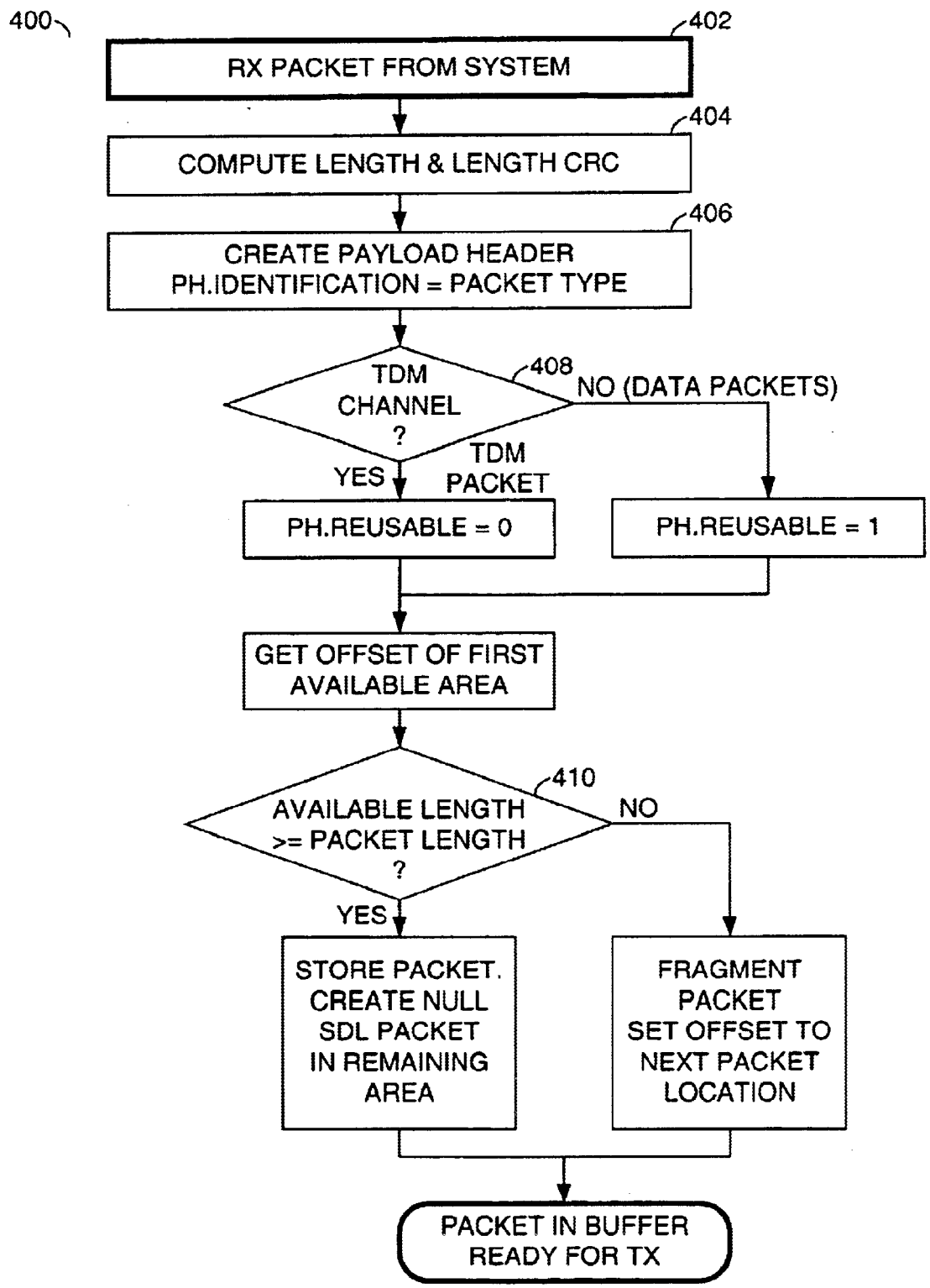
FIG. 12 is a flow chart illustrating an operation of the present invention.

Referring to FIG. 12, an example of a transmit operation 400 is shown. A device supporting HDT may receive a packet to be transmitted from a system side. In the transmit operation 400, a node may take inputs from different sources 402, encapsulate the packets with an SDL length/CRC fields 404, add an HDT header 406 to each of the packets, and then store the packets inside the SPE. The node may not send a fresh frame on the network in order to transmit the packets. A TDM channel check 408 may determine a reusability of the SPE 200. The transmit operation 400 may reuse available space in an incoming SPE (containing HDT frames). The transmit operation 400 may then may proceed to a length check 410 to see if there is any space available to insert the packet to be sent. If there is enough space, the entire packet is stored (with proper SDL framing and HDT header bytes). Any remaining bytes, depending on the size, are generally either (i) filled with a null HDT packet (e.g., the payload header identification bits are 0000) (ii) filled with SDL null packets (e.g., pairs of length/CRC with a null length field), or (iii) accounted for as tail-end padding (e.g., if the size is less than 4 bytes).

If the transmit operation 400 runs into a fixed-bandwidth channel allocation midway through the packet allocation, the packet is generally fragmented. In this case, a portion of the packet may be stored at one place and other fragments may be stored at another free location. The first fragment offset pointer may contain the starting location of second fragment. Because bytes are transmitted sequentially in the SPE 200, reassembling fragments may be easily achieved.

If a particular node detects an incoming SONET frame on a receive port, or if there is a frame in the transmit/receive queue, the node checks the frame to see if there are unused/reusable areas in the incoming/queued frame that can be used for sending data. If there is enough space available in the frame, the node fills the space with additional data before sending the frame out.

In HDT, PDH channels of any bandwidth (up to allowable SONET bandwidth limits) may be provisioned anywhere inside the SONET SPE. To achieve precise timing, PDH bytes must begin at the same offset inside the SONET SPE. However, allocation of PDH channels at different locations inside a SONET SPE may create fragments of unused bytes all over the SONET SPE. For efficient transport of variable-size IP packets, these unused bytes may be utilized for IP data.

Figure 13:
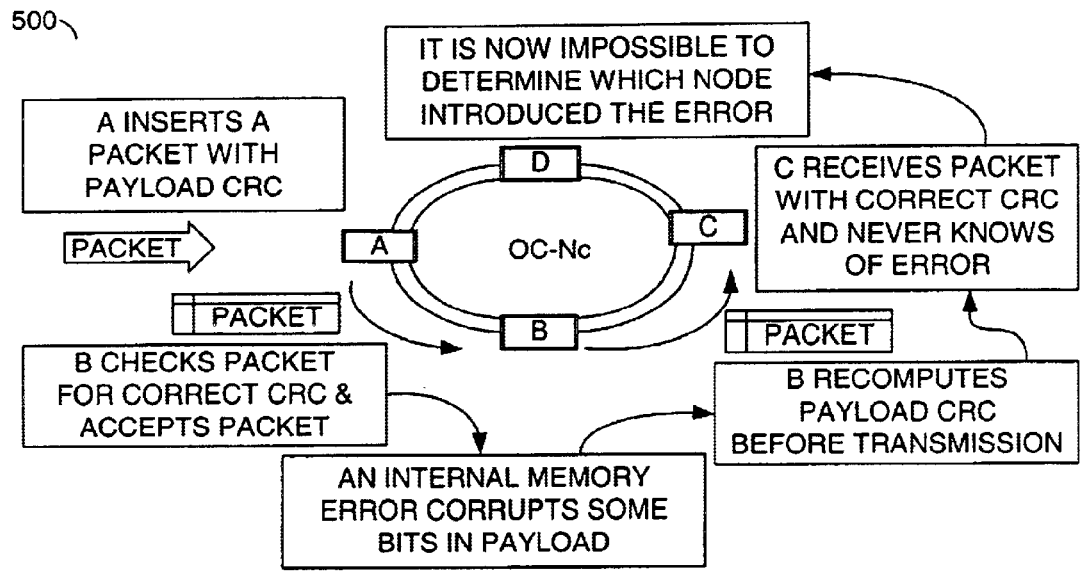
FIG. 13 is a block diagram illustrating an implementation of the present invention.

Referring to FIG. 13, an operation 500 for CRC error checking is shown. If bit errors occur at an upstream node that receives a packet with a correct CRC, the downstream node will never learn about the bit errors if the upstream node recomputed CRC for the packet before transmission. When MPLS is used, a node that receives the packet usually swaps the label with a different value, pops the label, or adds a new label to the stack. If MPLS is embedded inside a packet, payload CRC will change at each node.

One solution would be to check for CRC for ingress, but not to re-compute the CRC on egress. An efficient way to implement such CRC computation is to separate header CRC from payload CRC. This way, header CRC is recomputed easily and quickly at intermediate nodes while the payload CRC is preserved end-to-end. With HDT, all header labels and other temporary information for the packet may be carried outside of the payload so the payload data/CRC is not modified at any of the intermediate nodes.

A SONET node may be a data-aware add/drop multiplexer, a digital cross-connect, or a router/access multiplexer sitting on a SONET ring. Such devices may implement HDT protocol for data encapsulation and transport over SONET and WDM networks. Traditional circuitry for ATM cell delineation, PPP processing and other protocol handling may be implemented similar to conventional approaches, with some additional added circuitry for HDT encapsulation and decapsulation. The path signal label (PSL) value proposed for use with the HDT may be the same as the one for SDL frames.

Figure 14:
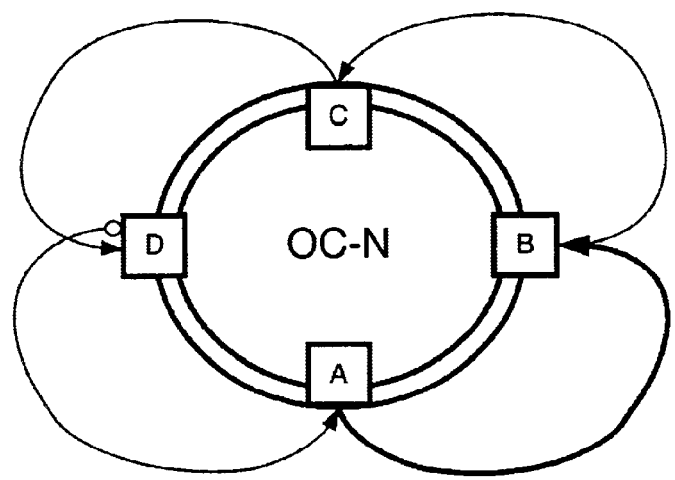
FIG. 14 is a block diagram illustrating an operation of the present invention.

Referring to FIG. 14, an example of spatial reuse with HDT is shown. Spatial reuse of bandwidth across a number of network nodes (e.g., A, B, C, D) may be achieved by permitting full or partial termination of individual packets at any node. Spatial reuse of bandwidth reclaimed from the terminated packet may increase performance. HDT may provide an ideal way to achieve spatial reuse of SONET bandwidth. Using add/drop of hybrid data, nodes can reuse released bandwidth for transmission of any of the various kinds of data.

As the SONET SPEs are received at the nodes A, B, C, D, initial bytes may be placed in a small transit buffer. Through MPLS labels contained in the header section or through internal packet fields, a particular node A, B, C, D may be able to determine whether the packet belongs to the node. If the packet does not belong to the node, the bytes are streamed out of transit buffer to the output port. However, the packet may belong to the node A, B, C, D if, for example, (i) the D7 bit is set in the payload header, (ii) the packet area has been reserved for a fixed bandwidth channel such as a PDH, and/or (iii) in this case, the D3: D0 bits are not cleared. If the D7 bit is set to "0", the node may clear the D3:D0 field to mark the packets void and reusable, where the bytes belonging to the packet are sent to system. The number of bytes sent to the system may be specified in the length field of the SDL header. If the header shows fragmentation then a packet is received in many fragments and sent out to the system until the last fragment is received.

Packets may be added either using a fresh SONET SPE or by reusing bytes inside an incoming or previously queued frame. The decision of which packet to add to a void or reusable packet area inside an SPE can be made on following lines by (a) selecting a packet (or a collection of packets) that will fit inside the reusable area, (b) selecting all packets that can fit inside the reusable space, or (c) selecting a packet based on QoS parameters or packet priority. Since SONET frames repeat at 125 ms intervals, packet transmission may be arranged to achieve a desired rate. Once a packet is selected for addition to the SPE, the node creates a payload header by setting payload type, reusability and other bits for the packet. The circuit 100 may then add the header to the payload.

The SDL framing mechanism may use length/CRC pair information as a header and a frame delimiter. SDL provides a robust scrambling and frame locator technique and may be used for direct data-over-fiber networks where SONET framing may not be used. Implementing OAM packets may eliminate the need for complex SONET framing and link management overheads. In the example of direct data-over-fiber networks, the HDT protocol structure may operate unmodified. Point-to-point WDM networks and ring-based SONET networks (or any other network) may easily be mixed and connected to each other. With a powerful support for MPLS (that may be transported independently of payload), networks may be designed that may have alternative LSP (Label Switched Paths) links for a highly robust redundancy. For example, nodes on a SONET ring may be connected through another network that may be entirely different from the ring. The backup path could be a high-speed point-to-point link or a ring network that may be geographically quite diverse. By providing a common network protocol engine, the HDT protocol may permit configuration of these networks quite easily without requiring complex protocol translation logic for different network configuration.

The present invention may use a packet payload header to identify the kind of packet inside. These identifier bits tell what kind of packet/protocol (e.g., such as Ethernet, PPP, IP, Frame Relay, ATM cells, T1, etc.) is inside the payload. Using such a technique, different protocols may be supported at two ends without the need for advanced provisioning. Using conventional methods, the use of a single protocol over a WAN needs to be negotiated.

The identifier may indicate whether one or more packet areas inside SONET SPE may be reused at an intermediate node. Conventional SONET networks require the SONET frame to travel around the ring until removed by the sender. Even when the receiving node received a packet, the frame went around the network, wasting bandwidth. With the present invention, not only may a receiver mark a SONET SPE as reusable, but different receivers on the fiber network may mark different sections of SONET SPE area as reusable when a packet is received by different receivers.

The present invention may provide the ability to mark a portion (or many portions) of a SONET SPE payload area as non-reusable. With such an implementation, when a receiver receives the packet, the packet area is not generally reused by another receiver/transmitter. However, the same receiver may reuse the marked payload area for add/drop applications. Allowing the same receiver to re-use a packet may help TDM channels and packet data within a single SPE.

Over time, bit definitions inside a payload header may change as further research is conducted on the fiber data protocol operation. Such changes in bit definitions are common in data communication protocols and do not change the nature and content of present invention.

The present invention often refers specifically to SONET. However, Synchronous Digital Hierarchy (SDH) protocols are equally appropriate. SDH is similar to SONET with differences in bit framing. These framing differences, however, do not change the discussion and scope of the present invention.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
    an interface connectable to a network, said interface configured to transmit information via a frame in said network, said frame comprising a packet envelope carrying a plurality of packets, wherein a first of said packets has (i) one or more labels configured to control routing of said first packet through said network, (ii) a link layer address following said labels, (iii) a payload to carry said information and (iv) a data identification portion having a plurality of bits (a) preceding said labels and (b) configured to identify a data type of said information.

2. The apparatus according to claim 1, wherein said network comprises one of a Synchronous Optical Network and a Synchronous Digital Hierarchy fiber optic network.

3. The apparatus according to claim 1, wherein said one or more labels comprise Multi-Protocol Label Switching labels.

4. The apparatus according to claim 1, wherein at least one of said packets further comprises:
    a Simple Data Link framing field;
    an error checking field for said Simple Data Link framing field; and
    a payload header configured to store configuration information to identify one of a plurality of protocols used in said packet.

5. The apparatus according to claim 1, wherein said link layer address comprises a destination address and a source address.

6. The apparatus according to claim 1, wherein said first packet further comprises an error portion configured to determine a data error.

7. The apparatus according to claim 1, wherein said network comprises a plurality of nodes configured to address said one or more labels.

8. The apparatus according to claim 7, wherein each of said nodes comprise de-framing hardware configured to read said one or more labels from said first frame.

9. The apparatus according to claim 8, wherein each of said plurality of nodes is configured to transport said first frame in response to said one or more labels.

10. The apparatus according to claim 1, wherein said second of said packets is void of said labels.

11. The apparatus according to claim 1, wherein said first packet further comprises a network layer address following said link layer address.

12. The apparatus according to claim 1, wherein said first packet has a first protocol and a second of said one or more packets has a second protocol unrelated to said first protocol.

13. The apparatus according to claim 1, wherein said frame further comprises:
    a frame header;
    a Path Overhead section in said frame header; and
    a path signal label in said Path Overhead section to specify each type of said one or more packets within said packet envelope.

14. An apparatus comprising:
    one or more nodes configured to transfer one or more frames on a network, each of said frames comprising a packet envelope carrying a plurality of packets, at least one of said packets having one or more labels configured to control switching of said at least one packet by said one or more nodes, wherein a first of said packets has a first protocol and a second of said packets has a second protocol unrelated to said first protocol.

15. The apparatus according to claim 14, wherein each of said frames further comprises:
    a frame header;
    a Path Overhead section in said frame header; and
    a path signal label in said Path Overhead section to specify each type of said one or more packets within said packet envelope.

16. A method for transmitting a plurality of packets of data, comprising the steps of:
    (A) transmitting a frame comprising a packet envelope carrying said packets, a first of said packets having (i) a first protocol, (ii) one or more labels and (iii) a payload and a second of said packets having a second protocol unrelated to said first protocol;
    (B) controlling switching of said first packet in said frame through said network in response to said one or more labels; and
    (C) switching said first packet to another network in response to said one or more labels.

17. The method according to claim 16, wherein said one or more labels comprises Multi-Protocol Label Switching labels.

18. The method according to claim 16, further comprising the step of:
    storing a path signal label in a Path Overhead section in a frame header of said frame to specify each type of said one or more packets within said packet envelope.

19. The method according to claim 16, wherein a third of said packets has a third protocol different than said first protocol and said second protocol.

20. The method according to claim 16, wherein step (A) comprises the sub-steps of:
    transmitting said one or more labels of said first packet; and
    transmitting a link layer address of said first packet after transmitting said one or more labels.

* * * * *